(12) United States Patent
Yin et al.

(10) Patent No.: US 9,040,659 B2
(45) Date of Patent: May 26, 2015

(54) METHODS AND MATERIALS FOR REMOVING METALS IN BLOCK COPOLYMERS

(71) Applicants: Jian Yin, Bridgewater, NJ (US); Hengpeng Wu, Hillsborough, NJ (US); Muthiah Thiyagarajan, Bridgewater, NJ (US); SungEun Hong, Basking Ridge, NJ (US); Mark Neisser, Whitehouse Station, NJ (US); Yi Cao, Clinton, NJ (US)

(72) Inventors: Jian Yin, Bridgewater, NJ (US); Hengpeng Wu, Hillsborough, NJ (US); Muthiah Thiyagarajan, Bridgewater, NJ (US); SungEun Hong, Basking Ridge, NJ (US); Mark Neisser, Whitehouse Station, NJ (US); Yi Cao, Clinton, NJ (US)

(73) Assignee: AZ ELECTRONIC MATERIALS (LUXEMBOURG) S.A.R.L., Luxembourg (LU)

( * ) Notice: Subject to any disclaimer, the term of this patent is extended or adjusted under 35 U.S.C. 154(b) by 0 days.

(21) Appl. No.: 14/175,203

(22) Filed: Feb. 7, 2014

(65) Prior Publication Data

US 2014/0151330 A1    Jun. 5, 2014

Related U.S. Application Data

(62) Division of application No. 13/416,669, filed on Mar. 9, 2012, now Pat. No. 8,686,109.

(51) Int. Cl.
| | |
|---|---|
| *C08G 64/00* | (2006.01) |
| *B05D 5/00* | (2006.01) |
| *B01D 15/36* | (2006.01) |
| *B01J 45/00* | (2006.01) |
| *C08J 3/00* | (2006.01) |
| *B01J 39/04* | (2006.01) |
| *B01J 41/04* | (2006.01) |
| *B05D 1/00* | (2006.01) |
| *B05D 3/00* | (2006.01) |
| *C08F 6/02* | (2006.01) |

(52) U.S. Cl.
CPC ............... *B05D 5/00* (2013.01); *B01D 15/361* (2013.01); *B01J 45/00* (2013.01); *C08J 3/00* (2013.01); *B01J 39/043* (2013.01); *B01J 41/046* (2013.01); *B05D 1/005* (2013.01); *B05D 3/00* (2013.01); *C08F 6/02* (2013.01)

(58) Field of Classification Search
USPC .................. 525/242, 276; 528/482
See application file for complete search history.

(56) References Cited

U.S. PATENT DOCUMENTS

| | | | |
|---|---|---|---|
| 3,161,630 | A | 12/1964 | Phelisse et al. |
| 3,285,949 | A | 11/1966 | Siebert |
| 3,474,054 | A | 10/1969 | White |
| 3,919,077 | A * | 11/1975 | Whitehurst ............... 208/251 R |
| 4,200,729 | A | 4/1980 | Calbo |
| 4,251,665 | A | 2/1981 | Calbo |
| 4,698,394 | A | 10/1987 | Wong |
| 5,136,029 | A | 8/1992 | Furukawa et al. |
| 5,187,019 | A | 2/1993 | Calbo et al. |
| 6,512,020 | B1 | 1/2003 | Asakura et al. |
| 7,471,614 | B2 | 12/2008 | Frommer et al. |
| 7,846,502 | B2 | 12/2010 | Kim et al. |
| 8,017,194 | B2 | 9/2011 | Colburn et al. |
| 8,226,838 | B2 | 7/2012 | Cheng et al. |
| 8,309,278 | B2 | 11/2012 | Yang et al. |
| 8,491,965 | B2 | 7/2013 | Cheng et al. |
| 8,686,109 | B2 | 4/2014 | Yin et al. |
| 8,691,925 | B2 | 4/2014 | Wu et al. |
| 8,795,539 | B2 * | 8/2014 | Lee et al. ......................... 216/37 |
| 8,835,581 | B2 | 9/2014 | Wu et al. |
| 2004/0151690 | A1 * | 8/2004 | Nakanishi et al. ......... 424/78.27 |
| 2004/0157948 | A1 | 8/2004 | Schlueter |
| 2007/0276104 | A1 | 11/2007 | Harruna et al. |
| 2008/0318005 | A1 | 12/2008 | Millward |
| 2009/0035668 | A1 | 2/2009 | Breyta et al. |
| 2009/0075002 | A1 | 3/2009 | Kim et al. |
| 2009/0196488 | A1 | 8/2009 | Nealey et al. |
| 2010/0316849 | A1 | 12/2010 | Millward et al. |
| 2011/0147984 | A1 | 6/2011 | Cheng et al. |
| 2012/0273460 | A1 | 11/2012 | Kang et al. |
| 2012/0285929 | A1 | 11/2012 | Matsumura et al. |
| 2013/0012618 | A1 | 1/2013 | Hiro et al. |
| 2013/0280497 | A1 | 10/2013 | Wilson et al. |
| 2013/0330668 | A1 | 12/2013 | Wu et al. |
| 2014/0193754 | A1 | 7/2014 | Wu et al. |
| 2014/0335324 | A1 | 11/2014 | Kim et al. |

FOREIGN PATENT DOCUMENTS

| | | |
|---|---|---|
| CA | 1 293 090 C | 12/1991 |
| EP | 0 227 124 A2 | 7/1987 |
| EP | 1 095 711 A2 | 5/2001 |
| GB | 715913 A | 9/1954 |
| JP | 58-225103 A | 12/1983 |
| JP | 2003-48929 A | 2/2003 |
| JP | 2008-88368 A | 4/2008 |

(Continued)

OTHER PUBLICATIONS

Machine Language English Abstract from JPO of JP 58-225103 A.

(Continued)

*Primary Examiner* — Terressa Boykin
(74) *Attorney, Agent, or Firm* — Sangya Jain

(57) ABSTRACT

The present invention relates to a method for treating a block copolymer solution, wherein the method comprises: providing a solution comprising a block copolymer in a non aqueous solvent; and, treating the solution to remove metals using an ion exchange resin. The invention also relates to a method of forming patterns using the treated block copolymer.

14 Claims, 1 Drawing Sheet

(56) References Cited

FOREIGN PATENT DOCUMENTS

| JP | 2010-260883 A | 11/2010 |
|----|---------------|---------|
| JP | 2011-18778 A | 1/2011 |
| WO | WO 2008/097736 A2 | 8/2008 |
| WO | WO 2012/022390 A1 | 2/2012 |
| WO | WO 2012/161106 A1 | 11/2012 |
| WO | WO 2013/050338 A1 | 4/2013 |
| WO | WO 2013/156240 A1 | 10/2013 |
| WO | WO 2013/160027 A1 | 10/2013 |

OTHER PUBLICATIONS

Machine Language English Abstract and Translation from JPO of JP 2013-8951 A, which is equivalent to WO 2012/161106 A1.
Form PCT/ISA1220, Form PCT/ISA/210, and Form PCT/ISA/237 dated Feb. 26, 2013 for PCT/IB2012/001905, which corresponds to U.S. Appl. No. 13/164,869.
Notice of Allowance and Fee(s) Due date mailed Apr. 21, 2014 for U.S. Appl. No. 13/492,125.
Koji Asakawa et al., "Nanopatterning with Microdomains of Block Copolymers using Reactive-Ion Etching Selectivity", Jpn. J. Appl. Phys. vol. 41 Part 1 No. 10, pp. 6112-pp. 6118 (2002).
Joona Bang et al., "Facile Routes to Patterned Surface Neutralization Layers for Block Copolymer Lithography", Advanced Materials vol. 19, pp. 4552-pp. 4557 (2007).
Christopher N. Bates et al., "Single- and Dual-Component Cross-Linked Polymeric Surface Treatments for Controlling Block Copolymer Orientation", Polymer Preprints vol. 52(1), pp. 181-pp. 182 (2011).
C. T. Black et al., "Integration of self-assembled diblock copolymers for semiconductor capacitor fabrication," Applied Physics Letters vol. 79 No. 3, pp. 409-pp. 411 (2001).
Kenneth C. Caster, "Applications of Polymer Brushes and Other Surface-Attached Polymers", Polymer Brushes Part 17, pp. 331-370 (2004).
Ghislain David et al., "Synthesis of α,ω-Phosponate Polysterene via Dead End Polymerization, Phosporus, Sulfur, and Silicon", Phosphorus, Sulfur, and Silicon vol. 179 No. 12, pp. 2627-pp. 2634 (2004).
Form PCT/ISA/220, Form PCT/ISA/210, and Form PCT/ISA/237 dated Feb. 26, 2013 for PCT/IB2012/001905, which corresponds to U.S. Appl. No. 13/243,640.
Form PCT/IB/326, Form PCT/IB/373, and Form PCT/ISA/237 dated Apr. 3, 2014 for PCT/IB2012/001905, which corresponds to U.S. Appl. No. 13/243,640.
Notice of Allowance and Fee(s) Due date mailed May 19, 2014 for U.S. Appl. No. 13/492,125.
Form PCT/ISA/220, Form PCT/ISA/210, and Form PCT/ISA/237 dated Aug. 6, 2014 for PCT/EP2014/059568, which corresponds to U.S. Appl. No. 13/892,890.
Joy Y. Cheng et al., "Templated Self-Assembly of Block Copolymers: Effect of Substrate Topography", Adv. Mater. vol. 15 No. 19, pp. 1599-pp. 1602 (2003).
Eric Drockenmuller et al., "Covalent Stabilization of Nanostructures: Robust Block Copolymer Templates from Novel Thermoreactive Systems," Journal of Polymer Science: Part A: Polymer Chemistry, vol. 43, pp. 1028-pp. 1037 (2005).
Iain E. Dunlop, "Interactions Between Polymer Brushes: Varying the Number of End-Attaching Groups", Macromol. Chem. Phys. vol. 205, pp. 2443-pp. 2450 (2004).
Eungnak Han et al., "Photopatternable Imaging Layers for Controlling Block Copolymer Microdomain Orientation", Advanced Materials vol. 19, pp. 4448-pp. 4452 (2007).
Craig J. Hawker et al., "Facile Synthesis of Block Copolymers for Nanolithographic Applications", Polymer Preprints vol. 46(2), pp. 239-pp. 240 (2005).
Craig J. Hawker, Initiating Systems for Nitroxide-Mediated "Living" Free Radical Polymerizations: Synthesis and Evaluation, Macromolecules vol. 29 No. 16, pp. 5246-pp. 5254 (1996).
Atsushi Hieno et al., "Quick Formation of DSA Neutralization Polymer Layer Attached by Reactive Self-Assembled Monolayer," J. Photopol. Sci. Tech. vol. 25 No. 1, pp. 73-pp. 76 (2012).
E. Huang et al., "Using Surface Active Random Copolymers to Control the Domain Orientation in Diblock Copolymer Thin Films", Macromolecules vol. 31 No. 22, pp. 7641-pp. 7650 (1998).
Shengxiang Ji et al., "Preparation of Neutral Wetting Brushes for Block Copolymer Films from Homopolymer Blends", Advanced Materials vol. 20, pp. 3054-pp. 3060 (2008).
G. J. Kellogg et al., "Observed Surface Energy Effects in Confined Diblock Copolymers", Physical Review Letters vol. 76 No. 14, pp. 2503-pp. 2506 (1996).
Bokyung Kim et al., "Dewetting of PMMA on PS-Brush Substrates", Macromolecules vol. 42 No. 20, pp. 7919-pp. 7923 (2009).
Bong Hoon Kim et al.; The Synthesis of Randum Brush for Nanostructure of Block Copolymer, Macromol. Symp., vol. 249-250, pp. 303-pp. 306 (2007).
Bumjoon J. Kim et al., "Importance of End-Group Structure in Controlling the Interfacial Activity of Polymer-Coated Nanoparticles", Macromolecules vol. 40 No. 6, pp. 1796-pp. 1798 (2007).
Yoojin Kim et al., "Effect of Architecture on the Self-Assembly of Block Copolymers at Interfaces: Linear-nanoparticle vs. Linear AB Diblocks", Polymeric Materials: Science & Engineering Vo. 92, pp. 399-pp. 400 (2005).
Yoojin Kim et al., "The Dramatic Effect of Architecture on the Self-Assembly of Block Copolymers at Interfaces", Langmuir vol. 21 No. 23, pp. 10444-pp. 10458 (2005).
Massimo Lazzari et al., "Methods for the Alignment and the Large-scale Ordering of Block Copolymer Morphologies," Block Copolymers in Nanoscience, Edited by M. Lazzari, G. Liu, and S. Lecommandoux, Copyright © 2006 Wiley-VCH Verlag GmbH & Co. KGaA, Weinheim, pp. 191-pp. 231.
Julie M. Leiston-Belanger et al., "A Thermal and Manufacture Approach to Stabilized Diblock Copolymer Templates", Macromolecules vol. 38 No. 18, pp. 7676-pp. 7683 (2005).
Mao-Peng Lin et al., "Photocrosslinking of Polymers Containing Cationically Polymerizable Groups in the Side-Chain by Sulfonium Salts," Journal of Polymer Science Part A: Polymer Chemistry vol. 30 Issue 5, pp. 933-pp. 936, (1992).
Hui Liu et al., "Random Poly(methyl methacrylate-co-styrene) Brushes by ATRP to Create Neutral Surfaces for Block Copolymer Self-Assembly," Macromol. Chem. Phys. vol. 213, pp. 108-pp. 115 (2012).
P. Mansky et al., "Controlling Polymer-Surface Interactions with Random Copolymer Brushes", Science Magazine vol. 275, pp. 1458-pp. 1460 (1997).
Holger Merlitz, "Surface Instabilities of Monodisperse and Densely Grafter Polymer Brushes", Macromolecules vol. 41 No. 13, pp. 5070-pp. 5072 (2008).
Hironobu Murata et al., "Synthesis of Functionalized Polymer Monolayers from Active Ester Brushes", Macromolecules vol. 40 No. 15, pp. 5497-pp. 5503 (2007).
Ricardo Ruiz et al., "Density Multiplication and Improved Lithography by Directed Block Copolymer Assembly", Science Magazine vol. 321, pp. 936-pp. 939 (2008).
Du Yeol Ryu et al., "Cylindrical Microdomain Orientation of PS-b-PMMA on the Balanced Interfacial Interactions: Composition Effect of Block Copolymers," Macromolecules vol. 42 No. 13, pp. 4902-pp. 4906 (2009).
Du Yeol Ryu et al., "A Generalized Approach to the Modification of Solid Surfaces", Science Magazine vol. 308, pp. 236-pp. 239 (2005).
I. E. Serhatli, "Synthesis of hybrid liquid crystalline block copolymers by combination of cationic or promoted cationic and free-radical polymerizations", Polymer Bulletin vol. 34, pp. 539-pp. 546 (1995).
Kazuo Sugiyama et al., "Preparation of surface-modified polysterene microspheres by an azo-initiator having analogous structure to the head group of phosphatidylcholine", Macromol. Chem. Phys. vol. 195, pp. 1341-pp. 1352 (1994).

(56) References Cited

OTHER PUBLICATIONS

T. Thurn-Albrecht et al., "Ultrahigh-Density Nanowire Arrays Grown in Self-Assembled Diblock Copolymer Templates", Science Vo. 290, pp. 2126-pp. 2129 (2000).
Toru Yamaguchi et al., "Resist-Pattern Guided Self-Assembly of Symmetric Diblock Copolymer", Journal of Photopolymer Science and Technology vol. 19 No. 3, pp. 385-pp. 388 (2006).
Toru Yamaguchi et al., "Two-Dimentional Patterning of Flexible Designs with High Half-Pitch Resolution by Using Block Copolymer Lithography", Advanced Materials vol. 20, pp. 1684-pp. 1689 (2008).
Yuanlie Yu et al., "The synthesis of novel fluorine—containing random polymer and application in modification of solid surfaces", Surface & Coatings Technology 205, pp. 205-pp. 212 (2010).
Restriction Requirement notification date Dec. 31, 2014 for U.S. Appl. No. 13/892,890.
Restriction Requirement notification date Dec. 26, 2014 for U.S. Appl. No. 14/039,809.
Form PCT/ISA1220, Form PCT/ISA/210, and Form PCT/ISA/237 dated Jan. 14, 2015 for PCT/IEP2014/070391, which corresponds to U.S. Appl. No. 14/039,890.
Notice of Allowance and Fee(s) Due notification date Feb. 20, 2015 for U.S. Appl. No. 14/180,848.

\* cited by examiner

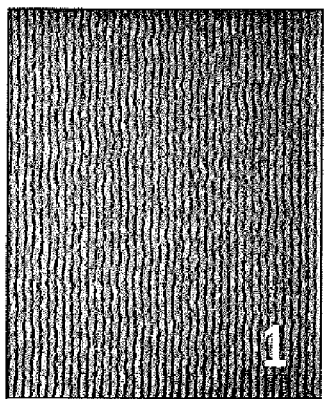
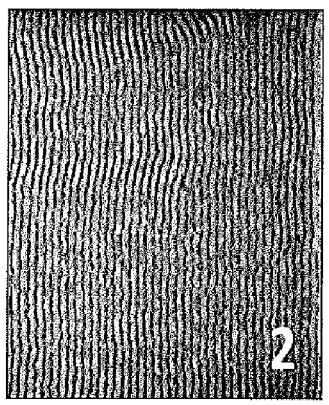
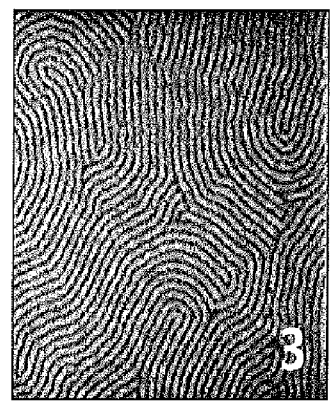

METHODS AND MATERIALS FOR REMOVING METALS IN BLOCK COPOLYMERS

CROSS-REFERENCE TO RELATED APPLICATION

This application is a divisional application of Ser. No. 13/416,669 filed Mar. 9, 2012, now granted as U.S. Pat. No. 8,686,109 B2 with the grant date Apr. 1 2014, the contents of which are hereby incorporated herein by reference.

FIELD OF THE INVENTION

The present application for patent is in the field of electronic materials and processes. More specifically, disclosed and claimed herein is a method of removing contamination from block copolymers.

BACKGROUND

As the development of nanoscale mechanical, electrical, chemical and biological devices and systems increases, new processes and materials are needed to fabricate nanoscale devices and components. This is especially true as the scale of these structures decreases into the nanometer length scale wherein dimensions may extend from a few nanometers to tens of nanometers. There is a particular need for materials and methods that are able to duplicate nanoscale patterns over large areas accurately and with a high degree of reproducibility and process latitude. Block copolymer materials are useful in nanofabrication because they self-assemble into distinct domains with dimensions from a few nanometers to the tens of nanometers.

However, existing methods of directed self assembly using block copolymer materials suffer from limitations. For example, defect formation remains an issue, particularly if there is a slight mismatch between the natural length scales of the polymer blocks and the guiding features in chemical or graphoepitaxy.

Further, it is usually desirable for the blocks within block copolymers to have narrow distributions in molar mass. Such distributions can be achieved by using anionic polymerization (see R. P. Quirk et al. in "Thermoplastic Elastomers," Hansen, Munich, Germany, pp. 74-78, (1996)) or +living free radical polymerization methods such as atom transfer radical polymerization (ATRP) (see, for example, T. E. Patten et al., Adv. Mater. Vol. 10, p. 901, 1998) or stable free radical polymerization (SFRP) using TEMPO (see, for example, N. A. Listigovers et al. Macromolecules Vol. 29, p. 8992, 1996) or similar nitroxide based initiators. However, these polymerization methods may tend to produce polymers containing various levels of metal ion contaminants such as aluminum, calcium, chromium, copper, iron, magnesium, manganese, nickel, potassium, sodium, zinc, tin, cadmium, cobalt, germanium, lead, lithium, silver, or titanium. Such contaminants may be undesirable in semiconductor manufacturing.

Moreover, as with any industrial process, it is desirable to allow as much process latitude as possible so that the influence of difficult-to-control process variables can be minimized.

What is needed therefore, are methods and materials for producing patterns via directed self assembly that offer low defect formation, low metal ion contamination and improved process latitude. One or all of these features may be obtained using the methods and materials disclosed and claimed herein.

BRIEF DESCRIPTION OF THE DRAWING

FIG. 1 illustrates the "benchmark" used to judge process latitude.

DETAILED DESCRIPTION OF THE DRAWING

FIG. 1 shows the benchmark used to judge whether the directed self assembly process has produced an acceptable image. In 1, the lines are straight, parallel and appear to have acceptable acuity. In 2, lines are generally parallel but appear to be losing persistence. In 3 the directing mechanism appears to have little or no effect; thus yielding the familiar undirected "fingerprint" pattern.

SUMMARY OF THE INVENTION

The present invention is related to the purification of block copolymer solutions using at least one ion exchange resin. The invention relates to a method, wherein the method comprises: providing a solution comprising a block copolymer in a non aqueous solvent; treating the solution with basic ion-exchange resin and/or a mixture of strong acid-type ion exchange resin and weak base-type ion exchange resin. The polymer in the solution may be in the concentration 0.1%-20% w/w. The invention also relates to a method for forming pattern from a self directed assembly of a block copolymer, where the block copolymer uses the novel purification method of the present invention.

DETAILED DESCRIPTION

As used herein, the conjunction "and" is intended to be inclusive and the conjunction "or" is not intended to be exclusive unless otherwise indicated. For example, the phrase "or, alternatively" is intended to be exclusive. As used herein, the term exemplary is understood to describe an example without indicating a particular preference. As used herein, metal ion contaminants are understood to be of various oxidation states known in the art. For example, the element cobalt may exhibit oxidation states as a bare species or in compounds, ranging from −3 to +4. Oxidation states of contaminant elements within a known range are understood as metal ion contaminants.

As a result of our research into the purification of nonaqueous block copolymer solutions by ion exchange, we have discovered several unexpected results: (1) that a basic (alkaline) ion exchange resin can successfully remove not only monovalent cations but divalent and trivalent cations; (2) that treatment of nonaqueous solutions of block copolymers using strong acid-type ion exchange resins and/or base-type ion exchange resins improves the process latitude of the directed self assembly process; and (3) treatment of the nonaqueous block copolymer solution with both strong acid-type ion exchange resins and base type ion exchange resins together has at least an additive effect on process latitude improvement. The process latitude of the directed self assembly process is increased by at least 2%, or at least 5%, or at least 10% or at least 15%, or at least 20%. At least one of the metal ions is reduced by at least 5%. In particular lithium is reduced.

Therefore, disclosed and claimed herein is a method of removing metal ions from a non aqueous block copolymer solution, wherein the method comprises: providing a solution comprising a block copolymer in a non aqueous solvent; adding a basic or alkaline ion exchange resin to form a slurry, filtering the slurry to remove the ion exchange resin. The ion exchange resin may be a weak basic or alkali ion exchange resin such as a free-base tertiary amine resin. The concentration of the block copolymer solution may be in the range of about 0.1%-20% w/w.

Further disclosed and claimed herein is a method, wherein the method comprises: providing a solution comprising a block copolymer in a non aqueous solvent; treating the solution with a basic ion exchange resin ion-exchange resin and/ or a strong acid cation exchange resin. The ion exchange resin may be a weak basic or alkali ion exchange resin such as a free-base tertiary amine resin. The polymer in the solution may be in the concentration 0.1%-20% w/w.

The invention also relates to a method for forming pattern from self directed assembly of a block copolymer, where the block copolymer has been purified using the novel purification method of the present invention for reducing metals.

The above described processes may include other ion exchange resins, for example by adding one or more additional sulfonic acid cation exchange resin to form a mixed slurry. The slurry can be agitated using a standard laboratory roller, or other agitator. It may be advantageous to avoid rupture or physical damage to the ion exchange beads to avoid the introduction of particulate matter and impurities that may reside in the interior of the resin beads.

It may be advantageous to dehydrate the ion exchange resins before use. For example, the cationic, strong acid ion exchange resin may be contacted with one or more solvents to displace the water on the ion exchange resin. Water miscible solvents such as methanol, ethanol, (iso)propanol, (iso)butanol, propylene glycol methyl ether and the like may serve to displace the adsorbed water more quickly. Notwithstanding, the solvent of choice for dissolving the block copolymer may also be used to displace the absorbed water on many types of ion exchange resin. The selection of the solvent may depend in part on whether the ion exchange resin can react with the solvent. For example, sulfonic acid-type ion exchange resins are known to catalyze the formation of lactic acid oligomers when used to treat ethyl lactate.

Solvents and diluents for dissolving block copolymers may include ketones, esters, ethers and alcohols, e.g., 2-heptanone, propylene glycol methyl ether acetate, ethyl lactate, propylene glycol methyl ether, anisole, methyl anisole, (iso) amyl acetate, ethyl cellosolve acetate, methyl cellosolve acetate, ethyl acetate and butyl acetate; butyrolactone; cyclohexanone, diethyloxylate and diethylmalonate; ethylene glycol diacetate and propylene glycol diacetate, ethyl 2-hydroxyisobutyrate and ethyl-3-hydroxypropionate. Solvents may be used alone or in admixture with each other and may be further mixed with non-solvents or other constituents such as surfactants and leveling agents.

While the process may use a slurry, it may also be convenient to use a sequential bed or mixed bed column process to purify the block copolymer solution. For a sequential bed process, a column may be charged first with the sulfonic acid based ion exchange beads and then charged with the basic ion exchange beads or vice versa. To avoid mixing, a neutral material may be interposed between the two beds.

In addition, a mixed bed column may be used; wherein both the sulfonic acid based ion exchange beads and basic ion exchange beads are blended together prior to charging the column. Such a system may be used to remove metal ions at sulfonic acid sites and then quickly remove the acidic materials on the basic column; thus reducing the potential for damage of the solvent or the solutes.

Without limitation, suitable basic ion exchange resins are generally cross linked materials such that they are not dissolved or swelled by water or other solvents. One type of material is based on polymers of substituted styrene and divinyl benzene. Both sulfonic acid type ion exchange materials and basic ion exchange materials of this type are known and many are available commercially from Dow Chemical Company or the Dow Corning Company. Such ion exchange resins may have morphologies which may be of the gel type, macroreticular or have various degrees of porosity.

For example, commercially available strong base ion exchange resins include Amberjet 4200 (gel-type), DOWEX 21K XLT (gel-type), and Lewatit Monoplus M500 (gel-type).

Weak base ion exchange resins may comprise tertiary amines as well as primary and secondary amines depending on requirements. Without limitation, they may also be based on ethylene diamine if chelating ability is required. For example, weak base ion exchange resins include Amberlite IRA-67 (gel-type), Amberlite IRA-96 (macroreticular), Amberlite IRA-743 (macroreticular), Amberlyst A21, (macroreticular), Duolite A7 (very porous), DOWEX M43 (macroporous), Lewatit MP-62 (macroporous), and Lewatit MP-64 (macroporous).

Commercially available strong sulfonic acid ion exchange resins of the macroporous type include, for example Lewatit SCP 118, Lewatit SCP 108, Amberlyst A15 and Amberlyst A35. Other strong acid ion exchange resins include Duolite C20, Duolite C26, Amberlite IR-120, Amberlite 200, Dowex 50, Lewatit SPC 118, Lewatit SPC 108, K2611, K2621, OC 1501.

In the foregoing, Amberlyte, Amberlyst, Amberjet Duolite, and DOWEX are trademarks of the Dow Chemical Company. Lewatit is a trademark of the Lanxess Company.

The block copolymer for use particularly in directed self assembly can be any block copolymers which can form domains through self assembly. The microdomains are formed by blocks of the same type which tend to self associate. Typically, block copolymer employed for this purpose are polymers in which the repeat units derived from monomers are arranged in blocks which are different compositionally, structurally or both and are capable of phase separating and forming domains. The blocks have differing properties which can be used to remove one block while keeping the other block intact on the surface, thus providing a pattern on the surface. Thus, the block may be selectively removed by plasma etching, solvent etching, developer etching using aqueous alkaline solution, etc. In block copolymers based on organic monomers, one block can be made from polyolefinic monomers including polydienes, polyethers including poly (alkylene oxides) such as poly(ethylene oxide), poly(propylene oxide), poly(butylene oxide) or mixtures thereof; and, the other block can be made from different monomers including poly((meth)acrylates), polystyrenes, polyesters, polyorganosiloxanes, polyorganogermanes, and or mixtures thereof. These blocks in a polymer chain can each comprise one or more repeat units derived from monomers. Depending on the type of pattern needed and methods used different types of block copolymers may be used. For instance, these may consist of diblock copolymers, triblock copolymers, terpolymers, or multiblock copolymers. The blocks of these block copolymers may themselves consist of homopolymers or copolymers. Block copolymers of different types may also be employed for self assembly, such as dendritic block copolymers, hyperbranched block copolymers, graft block copolymers, organic diblock copolymers, organoic multiblock copolymers, linear block copolymers, star block copolymers amphiphilic inorganic block copolymers, amphiphilic organic block copolymers or a mixture consisting of at least block copolymers of different types.

The blocks of organic block copolymer may comprise repeat units derived from monomers such as $C_{2-30}$ olefins, (meth)acrylate monomers derived from $C_{1-30}$ alcohols, inorganic-containing monomers including those based on Si, Ge, Ti, Fe, Al. Monomers based on $C_{2-30}$ olefins can make up a block of high etch resistance alone or do so in combination with one other olefinic monomer. Specific example of olefinic monomers of this type are ethylene, propylene, 1-butene, 1,3-butadiene, isoprene, dihydropyran, norbornene, maleic anhydride, styrene, 4-hydroxy styrene, 4-acetoxy styrene, 4-methylstyrene, alpha-methylstyrene or mixtures thereof. Examples of highly etchable units can be derived from (meth) acrylate monomers such as (meth)acrylate, methyl (meth) acrylate, ethyl (meth)acrylate, n-propyl (meth)acrylate, isopropyl (meth)acrylate, n-butyl (meth)acrylate, isobutyl (meth)acrylate, n-pentyl (meth)acrylate, isopentyl (meth) acrylate, neopentyl (meth)acrylate, n-hexyl (meth)acrylate, cyclohexyl (meth)acrylate, isobornyl (meth)acrylate, hydroxyethyl (meth)acrylate or mixtures thereof.

The blocks of organic block copolymer may comprise repeat units derived from monomers such as $C_{2-30}$ olefins, (meth)acrylate monomers derived from $C_{1-30}$ alcohols, inorganic-containing monomers including those based on Si, Ge, Ti, Fe, Al. Monomers based on $C_{2-30}$ olefins can make up a block of high etch resistance alone or do so in combination with one other olefinic monomer. Specific example of olefinic monomers of this type are ethylene, propylene, 1-butene, 1,3-butadiene, isoprene, dihydropyran, norbornene, maleic anhydride, styrene, 4-hydroxy styrene, 4-acetoxy styrene, 4-methylstyrene, alpha-methylstyrene or mixtures thereof. Examples of highly etchable units can be derived from (meth) acrylate monomers such as (meth)acrylate, methyl (meth) acrylate, ethyl (meth)acrylate, n-propyl (meth)acrylate, isopropyl (meth)acrylate, n-butyl (meth)acrylate, isobutyl (meth)acrylate, n-pentyl (meth)acrylate, isopentyl (meth) acrylate, neopentyl (meth)acrylate, n-hexyl (meth)acrylate, cyclohexyl (meth)acrylate, isobornyl (meth)acrylate, hydroxyethyl (meth)acrylate or mixtures thereof.

Without limitation, examples of block copolymers may include poly(styrene-b-methyl (meth)acrylate), poly(styrene-b-vinyl pyridine), polystyrene-b-butadiene), poly(styrene-b-isoprene), polystyrene-b-methyl methacrylate), poly (styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(methyl methacrylate-b-dimethylsiloxane), poly(styrene-b-polyethylene glycol), poly(styrene-b-ethyl methylsiloxane), polystyrene-b-lactide), poly(styrene-b-2-hydroxyethyl (meth)acrylate), polystyrene-b-2-hydroxypropyl (meth)acrylate), poly(dimethylsiloxane-b-n-butyl (meth)acrylate), poly(dimethylsiloxane-b-t-butyl (meth)acrylate), poly(dimethylsiloxane-b-hydroxy ethyl (meth)acrylate), poly(dimethylsiloxane-b-methyl meth acrylate-co-t-butyl methylacrylate), poly(dimethylsiloxane-b-1-ethoxy ethyl (meth)acrylate), poly(dimethylsiloxane-b-ε-caprolactone), poly(dimethylsiloxane-b-lactide), and poly (propylene oxide-b-styrene-co-4-vinyl pyridine) or a combination comprising at least one of the above described block copolymers. Block copolymers can be used with homopolymers comprising at least one of the blocks and random copolymers to enhance the desired self assembly, reduce required times or generate non symmetrical structures.

The block copolymer treated according to the novel process may be further used in any of the self assembly processes, such as those described in U.S. patent application with the Ser. No. 13/243,640 filed Sep. 23, 2011, U.S. Pat. No. 7,560,141, U.S. Pat. No. 7,521,094, US 2009/0179002, U.S. Pat. No. 7,471,614, US 2010/0124629, US 2008/0299353, and 2009/0087653, all of which are incorporated herein by reference.

The block copolymer solution can be coated onto a substrate to form a film and heated to allow the block copolymer to self align, particularly where a feature on the substrate is used to direct the block copolymer. The self aligned polymer is then wet or dry etched to remove one of the blocks and thereby forming a pattern on the substrate.

Each of the documents referred to above are incorporated herein by reference in its entirety, for all purposes. The following specific examples will provide detailed illustrations of the methods of producing and utilizing compositions of the present invention. These examples are not intended, however, to limit or restrict the scope of the invention in any way and should not be construed as providing conditions, parameters or values which must be utilized exclusively in order to practice the present invention.

EXAMPLES

In the following examples, styrene-b-methyl methacrylate block copolymers (S-MMA) were obtained from Polymer Source (PSI) of Dorval (Montreal), Quebec, Canada or AZ Electronic Materials (70, Meister Avenue, Somerville, N.J.) as indicated. Amberlyst A15 (A15) is a strongly acidic, sulfonic acid, macroreticular polymeric ion exchange resin available from the Dow Chemical Company. Amberlyst A21 (A21) is a weak base (tertiary amine) ion exchange resin in bead form, available from the Dow Chemical Company. Electronic grade propylene glycol methyl ether acetate (PGMEA) is available from AZ Electronic Materials. Block copolymers comprise block units of polystyrene and poly(methyl methacrylate). They are generally designated as such using the molecular weights of the individual blocks and the letter "b" to designate that they are block copolymers. For example, 18 k-b-21 k S-MMA denotes a block copolymer comprising a block of styrene repeat units of Mw 18,000 Daltons, chemically bonded to a block of methyl methacrylate repeat units of Mw 21,000 Daltons.

Examples 1-7

The indicated polymers in Tables 1 and 2 were dissolved in PGMEA at a concentration of 2% w/w. Ion exchange resins were added to the polymer solutions to form mixtures having the indicated percentages. The resulting mixtures were placed on a laboratory roller, allowed to mix over a period of about 20 hours and then filtered through a 0.2 μm Teflon filter to remove the ion exchange beads. Inductively coupled plasma mass spectrometry (ICP-MS) was used for analysis and results are listed in Table 1 and Table 2. Table 1 shows contaminant concentrations for the 19 listed metals in weight parts per billion, ppb, for ion-exchange treatments as described in Examples 1-3, as indicated. Table 2 shows contaminant concentrations for the 19 listed metals in weight parts per billion, ppb, for ion-exchange treatments as described in Examples 4-7, as indicated. In all cases, ionic contaminants were reduced substantially, compared to the contaminant levels of the untreated samples.

Examples 8-11

One sample was prepared according to Example 5, wherein the polymer is poly(styrene-b-methyl methacrylate) (21 k-b-

21 k) except that it received no ion exchange treatment. Two samples was prepared as in Example 5, except that, instead of receiving treatment with a combination of A21 and A15, each of these two samples received seperate treatment with A21 (20% w/w) and A15 (20% w/w). One sample was prepared as in Example 5.

The lithographic patterns of Table 3, were made using a lift-off process. The lift-off process is described in Cheng et al., ACS Nano 2010, 4 (8), 4815-4823. A spin-on-carbon underlayer antireflective material was spin coated on a 200 mm silicon wafer at 2800 rpm. The coated film was subject to a bake on a hotplate at 255° C. for 2 minutes to obtain a film thickness of 120 nm. An antireflective coating, SHB-A940 (Shin-Etsu Chemical) was coated atop the carbon underlayer followed by a bake at 220° C. for 90 seconds. The resulting stack was used for the photoresist process, in which ARX3538 (JSR Micro from Japan synthetic Rubber, Japan)) was coated and baked at 110° C. for 1 minute. The resulting 70 nm film was then exposed on a 193 nm scanner, Nikon 306D, post exposure baked (PEB) at 110° C. for 1 minute through an exposure range of 46-64 mJ/cm$^2$ in increments of 1 mJ/cm$^2$, and developed with AZ® 300MIF (available from AZ® Electronic Material) developer for 30 seconds. The patterned wafer was then flood-exposed, baked at 115° C. for 1 minute then baked at an elevated temperature of 200° C. for 5 minutes. A neutral layer formulation AZ® NLD-089 (AZ Electronic Materials), was spin coated on the wafer at 3000 rpm, and baked at 215° C. for 5 minutes to form a film of thickness 10 nm. The coated film was puddle developed with AZ 300MIF developer for 90 seconds and rinsed with deionized water for 30 seconds. Thereafter, materials of Example 8-11 were spin coated atop the resulting topography at 3400 rpm to form a 27 nm thick film which was then annealed at 250° C. for 5 minutes. The wafer was analyzed on a CD SEM, Applied Materials Nano 3D. The self assembly of the different blocks gave a nominal pitch of 25 nm. The resulting lithography was judged according to the exemplary photographs in FIG. 1, and rated from 1-3, with an assignment of 1 being acceptable, 2 being potentially acceptable and 3 being unacceptable. Exposure latitudes were calculated using the largest energy range with all exposures having a value of "1," except that one embeded value of "2" was also counted. So, for example, in Table 3, Example 9, the above described exposure energy range was from 46-56 mJ/cm$^2$, with a center exposure energy of 51 mJ/cm$^2$. Percent exposure latitude is the quotient of the range and the center exposure energy or 19.6% for Example 9, for example.

As can be seen from Table 3, the three samples, treated with ion exchange resins exhibited improved exposure latitude over the exposure latitude of 3.3% (2 mJ/cm$^2$/60 mJ/cm$^2$) determined for the untreated sample. However, the sample treated with the combined ion exchange resins exhibited the best percent exposure latitude of 27.0%.

Although the present invention has been shown and described with reference to particular examples, various changes and modifications which are obvious to persons skilled in the art to which the invention pertains are deemed to lie within the spirit, scope and contemplation of the subject matter set forth in the appended claims.

TABLE 1

Metal Ion Concentrations, ppb
P-2449-SMMA-1
(PSI)

| | | Example | | |
|---|---|---|---|---|
| | Before treatment | 1 20% A15 | 2 20% A21 | 3 10% A15, 10% A21 |
| Aluminum | 9.37 | 0.0545 | 0.456 | <0.03 |
| Calcium | 26.37 | 0.186 | 1.337 | 0.3125 |
| Chromium | 6.28 | 0.035 | 0.167 | 0.8225 |
| Copper | 4.77 | 0.4385 | 0.0805 | 0.1495 |
| Iron | 6.95 | 1.67 | 0.1405 | 0.8745 |
| Magnesium | 5.55 | 0.118 | 0.2645 | 0.1275 |
| Manganese | 1.56 | 0.056 | <0.01 | 0.022 |
| Nickel | 1.41 | 0.078 | 0.0365 | 0.1285 |
| Potassium | 11.68 | 0.136 | 0.251 | 0.6825 |
| Sodium | 69.95 | 1.1445 | 1.1475 | 1.2115 |
| Zinc | 142.51 | 16.7795 | 2.424 | 2.2465 |
| Tin | <0.12 | 0.1515 | <0.06 | <0.06 |
| Cadmium | <0.4 | <0.02 | <0.02 | <0.02 |
| Cobalt | 0.56 | 0.0575 | <0.01 | <0.01 |
| Germanium | <0.2 | 0.0115 | <0.01 | <0.01 |
| Lead | 1.22 | 0.0215 | <0.01 | 0.0245 |
| Lithium | 4374.46 | 0.1315 | 36.5545 | 0.288 |
| Silver | 18.35 | 0.0715 | 0.0245 | 0.0285 |
| Titanium | <0.2 | <0.01 | <0.01 | <0.01 |

* all results in 2% PGMEA solution

TABLE 2

Metal Ion Concentrations, ppb

| | Example | | | | | | | |
|---|---|---|---|---|---|---|---|---|
| | 4 P-2449-SMMA-2 (PSI) | | 5 SMMA AZ Electronic Materials | | 6 P8966-SMMA (PSI) | | 7 SMMA AZ Electronic Materials | |
| | Before treatment | 10% A15, 10% A21 | Before treatment | 10% A15, 10% A21 | Before treatment | 10% A15, 10% A21 | Before treatment | 10% A15, 10% A21 |
| Aluminum | 3.32 | 0.1 | 28.1 | 0.165 | 3.32 | 1.3705 | 11.5 | 0.069 |
| Calcium | 9.675 | 0.46 | 79.35 | 0.564 | 11.38 | 1.111 | 21.45 | 0.164 |
| Chromium | 11.69 | <0.02 | 97.5 | 0.0465 | 25.86 | 0.1025 | 97.25 | 0.0265 |
| Copper | 2.11 | 0.19 | 19.95 | 0.1345 | 3.19 | 0.067 | 2531.75 | 16.2265 |
| Iron | 13.815 | 0.09 | 63.2 | <0.06 | 13.45 | 0.0335 | 57.8 | 0.056 |
| Magnesium | 1.34 | 0.09 | 26.75 | 0.1915 | 1.3 | 0.197 | 2.6 | 0.0295 |

TABLE 2-continued

Metal Ion Concentrations, ppb

| | Example | | | | | | | |
|---|---|---|---|---|---|---|---|---|
| | 4 P-2449-SMMA-2 (PSI) | | 5 SMMA AZ Electronic Materials | | 6 P8966-SMMA (PSI) | | 7 SMMA AZ Electronic Materials | |
| | Before treatment | 10% A15, 10% A21 | Before treatment | 10% A15, 10% A21 | Before treatment | 10% A15, 10% A21 | Before treatment | 10% A15, 10% A21 |
| Manganese | 0.25 | 0.01 | <1 | <0.01 | <0.2 | 0.031 | <1 | <0.01 |
| Nickel | 2.275 | 0.01 | 10.5 | 0.041 | 1.9 | 0.03 | 8.95 | <0.01 |
| Potassium | 6.6 | 0.24 | 49.2 | 0.3595 | 8.23 | 0.0515 | 12.4 | 0.0455 |
| Sodium | 30.275 | 0.86 | 1631.95 | 0.2975 | 317.44 | 0.1685 | 1792.9 | 2.0835 |
| Zinc | 10.405 | <0.04 | 12 | 0.056 | 51.66 | 0.467 | 103.7 | 0.26 |
| Tin | <0.6 | <0.06 | <6 | 0.2005 | <0.2 | <0.01 | <1 | 0.025 |
| Cadmium | <0.4 | <0.02 | <2 | <0.02 | <0.4 | <0.02 | 4.15 | <0.02 |
| Cobalt | <0.2 | <0.01 | <1 | <0.01 | <0.2 | <0.01 | <1 | <0.01 |
| Germanium | 0.115 | 0.02 | <1 | <0.01 | <0.2 | <0.01 | <1 | <0.01 |
| Lead | 0.955 | <0.01 | 1.7 | <0.01 | 2.28 | <0.01 | 10.6 | 0.0185 |
| Lithium | 1932.07 | <0.03 | 623.05 | 7.037 | 29.55 | <0.02 | <2 | 0.028 |
| Silver | 0.475 | <0.01 | <1 | <0.01 | <0.2 | <0.01 | 54.75 | 0.1075 |
| Titanium | <0.2 | <0.01 | <1 | <0.01 | 0.22 | <0.01 | 3.95 | <0.01 |

*all results in 2% PGMEA solution

TABLE 3

Exposure Latitude Comparison - Treated and Untreated Samples

| | Exposure Dose, mJ/cm$^2$ | | | | | | | | | | | | | | | | | | | EL, % |
|---|---|---|---|---|---|---|---|---|---|---|---|---|---|---|---|---|---|---|---|---|
| | 46 | 47 | 48 | 49 | 50 | 51 | 52 | 53 | 54 | 55 | 56 | 57 | 58 | 59 | 60 | 61 | 62 | 63 | 64 | |
| Example 8 Untreated | 3 | 2 | 2 | 2 | 2 | 2 | 2 | 2 | 1 | 1 | 2 | 3 | 2 | 1 | 1 | 1 | 3 | 1 | 1 | 3.3 |
| Example 9 A15 - 20% | 1 | 1 | 1 | 1 | 1 | 2 | 1 | 1 | 1 | 1 | 1 | 3 | 2 | 3 | 3 | 3 | 3 | 3 | 3 | 19.6 |
| Example 10 A21 - 20% | 3 | 2 | 3 | 2 | 1 | 1 | 1 | 1 | 1 | 1 | 1 | 2 | 2 | 2 | 1 | 1 | 1 | 1 | 2 | 9.4 |
| Example 11 A15/A21 10%-10% | 1 | 3 | 1 | 1 | 1 | 1 | 1 | 1 | 1 | 1 | 1 | 2 | 1 | 1 | 1 | 1 | 1 | 1 | 2 | 27.0 |

EL, % Denotes the exposure latitude expressed as a % of the optimal central exposure value.

What is claimed is:

1. A method of forming a directed self assembly pattern comprising the steps of;
   a. coating a substrate with a solution with reduced metal ion contamination content, wherein the solution comprises a block copolymer where the block copolymer is derived from monomers which are arranged in blocks which are different compositionally, structurally or both and are capable of phase separating and forming domains, and further wherein the blocks have differing etch properties which can be used to remove one block while keeping the other block intact on the surface of the substrate, thus providing a pattern on the surface of the substrate and further where the solution with reduced metal ion contamination is produced by,
      i. treating the solution with a basic ion exchange to form a slurry; and,
      ii. filtering the slurry to remove the ion exchange resin;
   b. heating the substrate to form a directed self assembly polymer layer; and
   c. removing one block of the block copolymer and thereby forming a pattern.

2. The method of claim 1, where one block is removed by wet or dry etching step.

3. The method of claim 1, wherein the basic ion exchange resin has a morphology chosen from gel type, macroreticular or porous; and wherein, as a result of treating the block copolymer solution, one or more metal ion contaminants chosen from aluminum, calcium, chromium, copper, iron, magnesium, manganese, nickel, potassium, sodium, zinc, tin, cadmium, cobalt, germanium, lead, lithium, silver, or titanium are reduced by at least 5% from their initial pretreatment values.

4. The method of claim 1, wherein the solution comprises a concentration of 0.1%-20% w/w of the block copolymer.

5. The method of claim 1, wherein, as a result of treating the block copolymer solution, the percent exposure latitude of the block copolymer is increased by at least 2 percentage points.

6. The method of claim 1, further comprising adding a sulfonic acid cation exchange resin to form a mixed slurry.

7. The method of claim 6, wherein the sulfonic acid cation exchange resin has a morphology chosen from gel-type, macroreticular or porous; and wherein, as a result of treatment, one or more metal ion contaminants chosen from aluminum, calcium, chromium, copper, iron, magnesium, manganese, nickel, potassium, sodium, zinc, tin, cadmium, cobalt, germanium, lead, lithium, silver, or titanium are reduced by at least 5% from their initial values.

8. The method of claim 6, wherein, as a result of treating the block copolymer solution, the percent exposure latitude is increased by at least 2 percentage points.

9. The method of claim 1 where the basic ion exchange resin is dehydrated by contact with an organic solvent prior to contact with the solution.

10. The method of claim 6 where the sulfonic acid cation exchange resin is dehydrated by contact with an organic solvent prior to contact with the solution.

11. The method of claim 1, wherein the block copolymer is chosen from poly(styrene-b-methyl (meth)acrylate), poly(styrene-b-vinyl pyridine), poly(styrene-b-polyethylene glycol), poly(styrene-b-dimethylsiloxane), poly(styrene-b-ethyl methylsiloxane), poly(styrene-b-lactide), poly(styrene-b-2-hydroxyethyl (meth)acrylate), poly(styrene-b-2-hydroxypropyl (meth)acrylate), poly(dimethylsiloxane-b-n-butyl (meth)acrylate), poly(dimethylsiloxane-b-t-butyl (meth)acrylate), poly(dimethylsiloxane-b-hydroxy ethyl (meth)acrylate), poly(dimethylsiloxane-b-methylmethacrylate-co-t-butyl methyl acrylate), poly(dimethylsiloxane-b-1-ethoxy ethyl (meth)acrylate), poly(dimethylsiloxane-b-$\epsilon$-caprolactone), poly(dimethylsiloxane-b-lactide), or poly(propylene oxide-b-styrene-co-4-vinyl pyridine).

12. The method of claim 1, wherein the etch properties are plasma etching.

13. The method of claim 1, wherein the etch properties are solvent etching.

14. The method of claim 1, wherein the etch properties are developer etching.

* * * * *